UNITED STATES PATENT OFFICE.

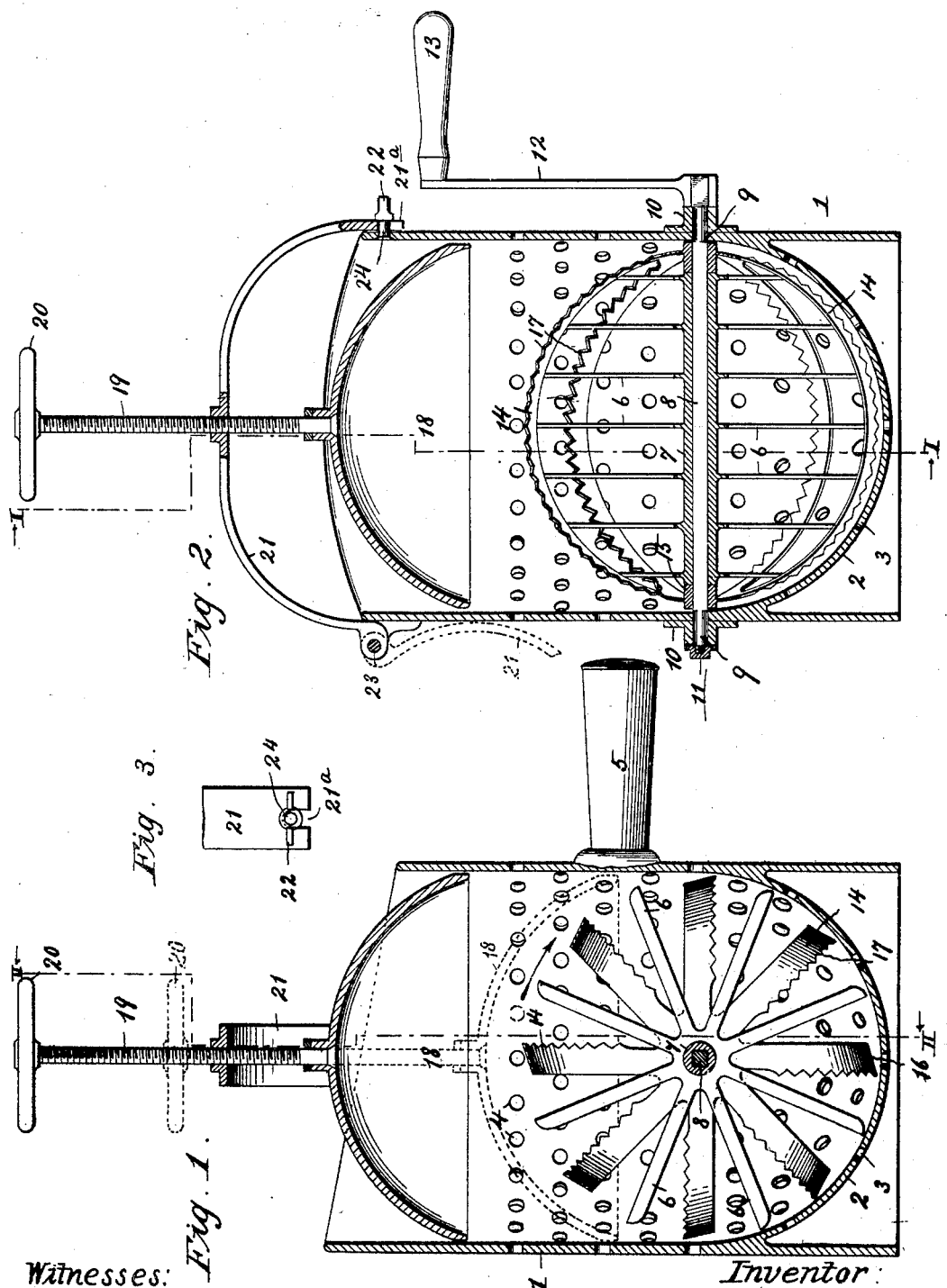

MARY C. JENKINS, OF KANSAS CITY, KANSAS.

COLANDER.

SPECIFICATION forming part of Letters Patent No. 679,564, dated July 30, 1901.

Application filed August 9, 1900. Serial No. 26,332. (No model.)

*To all whom it may concern:*

Be it known that I, MARY C. JENKINS, a citizen of the United States, and a resident of Kansas City, in the county of Wyandotte and State of Kansas, have invented a new and useful Colander, of which the following is a specification.

My invention relates to improvements in colanders; and my object is to provide a utensil of this character for the purpose of cutting up raw or cooked fruits and pressing out their juices preparatory to making jellies, syrups, apple-float, &c.

My invention may be said to consist in the novel arrangement and combination of parts hereinafter described, and pointed out in the claims.

Referring now to the accompanying drawings, which illustrate the invention, Figure 1 represents a vertical sectional view of the invention, taken on line I I of Fig. 2, showing the operation of the plunger by dotted lines. Fig. 2 is a vertical sectional view taken on line II II of Fig. 1, showing the plunger in dotted lines removed from the cylinder preparatory to filling the latter. Fig. 3 is a detail of the clamping-nut for securing the plunger-frame in position in the cylinder.

In constructing my colander I employ a cylindrical casing 1, composed of glass, porcelain, or other suitable material, open at the top and provided at its lower portion with a hemispherical-shaped bottom 2, having perforations 3, through which the juices are pressed into a pan or other utensil placed beneath the colander. The sides of the colander are also provided with perforations 4 to a point above the dasher for the same purpose. For convenience in manipulating the utensil, I secure a handle 5 to the rear side of the cylinder. After the fruit has been deposited in the cylinder it is thoroughly cut up and separated by means of a rotary dasher comprising a series of radial cutters 6, graduated to fit the contour of the bottom 2 and secured at their inner portions to a tube 7, removably mounted upon a square transverse shaft 8, having cylindrical ends 9, journaled in bearings 10, secured to the opposite sides of the cylinder. Said shaft is secured in position by a nut 11 at one end and an operating-crank 12 at its opposite terminal, the crank being provided with a handle 13 for convenience in turning. Also mounted upon shaft 8 and adapted to turn therewith is a series of loops 14, suitably secured at their opposite ends to bearings 15, having square apertures to receive the shaft. The face portions 16 of said loops are arranged to present an inclined surface to the hemispherical bottom in order that when rotating in the direction indicated by the arrow in Fig. 1 they will catch and press the fruit against the bottom 2 and force the juice through the perforations thereof, while the serrated rear edges 17 of the loops will thoroughly macerate the smaller particles of fruit not cut by the knives by pressing them against said bottom 2. In order that the dasher may the more effectually perform its work, I press the fruit in contact therewith by a vertically-operating plunger, which also prevents the fruit or a portion thereof from being cast out of the cylinder by the rotating dasher.

The plunger consists of a convex plate 18, pivotally secured at its central upper portion to the lower terminal of a vertically-disposed screw 19, provided at its upper end with an operating-wheel 20 and working through an internally-threaded aperture in a curved cross-bar 21, secured at its opposite ends to the upper portion of the cylinder by a clamping-nut 22 and a hinge 23. Thumb-nut 22 engages a screw 24, projecting from the side of the cylinder through the bifurcated end 21ᵃ of transverse bar 21. By this arrangement the colander can be easily refilled when in use by giving the clamping-nut one or two turns and throwing the cross-bar carrying the plunger back on the hinge, as shown by dotted lines, Fig. 2.

After the colander has been used it may be readily cleaned by removing the plunger, as above described, and then by taking off nut 11 and withdrawing the shaft the dasher may be taken out and washed.

From the above description it will be understood that I have produced a colander which is simple in construction and thoroughly effective in operation.

Having thus described the invention, what I claim as new, and desire to secure by Letters Patent, is—

1. A colander, comprising an outer cylinder having a hemispherical bottom portion, perforations arranged in the side and bottom of said cylinder, a handle rigidly secured to the side thereof, a transverse shaft journaled in the opposite sides of the same, an operating-crank provided with a handle at one end, and an aperture at its opposite end to receive one of the terminals of the shaft, a tubular shaft fitting over the first-mentioned one and adapted to revolve therewith, and a series of knives graduated in length to conform to the interior shape of the vessel rigidly secured to said tubular shaft, substantially as described.

2. A colander, comprising an outer cylinder having a hemispherical bottom, perforations arranged in the side and bottom of said cylinder, a handle rigidly secured to the side thereof, a square transverse shaft journaled in the opposite sides of same, an operating-crank provided with a handle at one end, and a square aperture at its opposite end to receive one of the terminals of the shaft, a tubular shaft fitting over the first-mentioned one and adapted to rotate therewith, and a series of knives graduated in length to conform to the interior shape of the vessel rigidly secured to said tubular shaft, substantially as described.

3. A colander, comprising a perforated cylinder having a hemispherical bottom portion, a rotary dasher mounted therein, a crank for operating the dasher, a bar secured to the upper opposite sides of the cylinder and provided with a central aperture, a vertical rod adjustably operating through said aperture, and a convex plate secured to the lower terminal of said rod, substantially as described.

4. A colander, having a perforated cylinder and hemispherical bottom portion, a rotary dasher mounted therein, means for operating the dasher, a transverse bar secured to the upper portion of the cylinder and provided with a threaded central aperture, a vertically-disposed screw arranged to operate through said aperture, an operating-wheel secured to the upper end of the screw, and a convex plate secured to its lower end, substantially as described.

5. A colander, comprising an outer cylinder having a hemispherical bottom portion, perforations arranged in the side and bottom thereof, a handle rigidly secured to one side of the same, a transverse shaft journaled in the opposite sides of the cylinder, an operating-crank secured to one of the terminals of said shaft, a tubular shaft fitting over the first-mentioned one, and adapted to revolve therewith, a series of knives graduated in length to conform to the interior shape of the vessel rigidly secured to the tubular shaft, and a series of loops provided with bearings at their opposite sides having apertures to receive the transverse shaft, substantially as described.

6. A colander, comprising an outer cylinder having a hemispherical bottom portion, perforations arranged in the side and bottom thereof, a handle rigidly secured to one side of the same, a transverse shaft journaled in the opposite sides of the cylinder, an operating-crank secured to one of the terminals of said shaft, a tubular shaft fitting over the first-mentioned one, and adapted to revolve therewith, a series of knives graduated in length to conform to the interior shape of the vessel rigidly secured to the tubular shaft, a series of loops provided with bearings at their opposite sides having apertures to receive the transverse shaft, a hinged frame secured to the upper end of the cylinder provided with a central threaded aperture, a plunger consisting of a vertically-arranged screw operating through said aperture having an operating-wheel secured to its upper terminal, and a convex plate secured to its lower end, substantially as described.

In testimony whereof I affix my signature in the presence of two witnesses.

MARY C. JENKINS.

Witnesses:
 F. G. FISCHER,
 H. C. RODGERS.